United States Patent Office 3,555,146
Patented Jan. 12, 1971

3,555,146
ANTIPERSPIRANT COMPOSITION
John L. Jones, North Plainfield, and Andrew M. Rubino, Providence, N.J., assignors to Armour Pharmaceutical Company, Chicago, Ill., a corporation of Delaware
No Drawing. Original application Sept. 15, 1965, Ser. No. 487,580, now Patent No. 3,405,153, dated Oct. 8, 1968. Divided and this application Nov. 13, 1967, Ser. No. 704,200
Int. Cl. A61k 7/00
U.S. Cl. 424—47  2 Claims

ABSTRACT OF THE DISCLOSURE

An antiperspirant preparation comprising an inorganic-organic complex of the formula:

$$nQ \cdot Al_2(OH)_{4-5}A_{1-2}R_{1-4}H_2O_{0.5-4}$$

wherein Q is a zinc chloride, iodide or bromide or hydroxychloride, hydroxy iodide or hydroxy bromide or a zirconyl chloride or hydroxy chloride, A is chloride, bromide or iodide, R is the coordinating moiety of a polyhydroxy compound having at least two carbon atoms and at least two hydroxy groups, with $n$ being the number of moles for Q and at least 0.05, and with the antiperspirant preparation containing conventional cosmetic adjuvants.

---

This application is a division of application Ser. No. 487,580 filed Sept. 15, 1965, now U.S. Pat. 3,405,153 issued Oct. 8, 1968.

The present invention relates generally to novel metal-aluminum inorganic-organic complexes which have an unexpectedly high degree of metal-aluminum ionicity and significant solubility in non-aqueous media, to methods of making such complexes, and to methods of and preparations employing such complexes in the formulation of novel and effective non-aqueous compositions which are useful as antiperspirants.

Certain background information will help to more fully appreciate and understand the present invention. For example, it is well to understand that the enhanced solubility in non-aqueous media which is exhibited by the complexes of this invention is extremely significant since it is accomplished without losing the ionicity of metal coordinated therein.

Inextricably bound to the concept of antiperspirancy, or astringency, as it is sometimes characterized, is the requirement that the active agents to be effcetive must retain their ionic character (herein denominated "ionicity"). This is because it is the ionic form of these agents which is effective as an antiperspirant, not the covalent form. The many known alcohol-soluble metal-aluminum compounds are irrelevant to the present disclosure because without exception (and here we refer to significant, not trace solubility), they are compounds in which the metal-aluminum exist in its covalent form and therefore are relatively useless as antiperspirants.

Thus, an important consideration of the present invention is to obtain a complex of aluminum and metals (as shall be defined) which maintains substantially all of the ionicity of the aluminum and the metal and thereby achieves the optimum of antiperspirancy.

A second consideration is to develop an antiperspirant which permits the use of aerosol dispensers, a packaging form which heretofore has not been adaptable for true antiperspirants because of many problems presented by prior antiperspirant formulations. Thus, while the aerosol dispenser has been successfully adapted to the deodorant field by the packaging of certain bactericides (e.g., zinc sulfocarbolate and hexachlorophene) in an alcohol vehicle and mixed with a suitable propellant, these products do not materially affect the exudation of perspiration by the body and therefore are not true antiperspirants. The aerosol dispenser has had extremely limited application to the antiperspirant field because of the inability of the art to achieve a solubility in excess of about 1 to 3% (as obtained, for instance, with aluminum phenolsulfonate). In contrast, it is generally accepted that no composition is effective as an antiperspirant at less than a minimum concentration of about 10 percent of the active ingredient.

If the aerosol dispenser is to be adapted to the antiperspirant field, a whole new set of problems must be solved and a list of goals established. (See: Cosmetics, Science and Technology, Chap. XXXVI. Aerosol Cosmetics, Interscience Publishers, Inc., New York, pages 826 et seq.) For instance, an antiperspirant composition must inhibit perspiration in a safe and non-corrosive manner and it must be compatible with those compounds employed to propel aerosol sprays. Furthermore, such a composition should contain a minimal water content (maximum tolerable is 2–3%) so as to eliminate the extreme corrosion induced by aqueous media in and to the metal valves and containers (glass lined containers are much too expensive), and the product contamination which results therefrom. Furthermore, such compositions must be capable of being dissolved in the associated carrier in concentrations of at least 10%.

In an attempt to solve the myriad of problems confronting us, we have chosen to return to the efforts of the art to develop aluminum containing compositions which are effective as antiperspirants but are substantially non-corrosive to the user's skin or wearing apparel. We have chosen this route because even the generally accepted "best" antiperspirant available, namely, aluminum chlorhydroxide (available, for instance, under the trademark "Chlorhydrol" from the Reheis Chemical Company, a Division of Armour Pharmaceutical Company) contains about 20% free and bound water, as determined by The Karl Fisher Analysis; is insoluble in non-aqueous media, e.g., 100% alcohol, 100% propylene glycol, and 100% glycerine; and indeed, requires water or other water-containing solvents to obtain a soluble state.

We start, therefore, in an art in which there is no truly effective and non-corrosive antiperspirant known which does not require aqueous media for dissolution. Our goal is to develop new and novel antiperspirant compounds and formulations which are capable of approaching the high antiperspirancy heretofore generally attributed to the mineral acid salts of aluminum, which eliminate substantially all of the body and clothing corrosion which accompanied the use of such mineral acid salts, which, simultaneously, are compatible with the available aerosol propellants, such as the halogenated (fluoro and/or chloro) hydrocarbons, which can be packaged and stored under pressure in expensive metal containers without fear of contamination from rust or explosion, and which contain an available active antiperspirant in concentrations of at least 10%.

The present invention is predicated upon our discovery of new complexes (coordination compounds) containing a metal selected from the group consisting of zinc and zirconium, and aluminum which complexes maintain the ionicity of the metals and thereby are highly effective as antiperspirants (astringency being the key characteristic). Furthermore, our complexes are compatible with halogenated hydrocarbon propellants, and most importantly, are soluble in non-aqueous media to provide effective concentrations of 10% or greater. We have further discovered how to make these complexes in an easy and economical fashion and to formulate effective liquid antiperspirant compositions from them which compositions are highly suited for use, inter alia, in the aerosol dispensers. We have also developed certain lotions and cremes in which our complexes are highly effective.

Accordingly, a prime object of the present invention is to provide new coordination compounds (complexes) of aluminum with zinc and/or zirconium, which compounds: are readily soluble in non-aqueous media; are compatible with conventional aerosol dispenser propellants, such as the halogenated hydrocarbons; exhibit effective and safe antiperspirant action; and can be prepared in such a manner as to permit the presentation of a competitive product in the marketplace, that is, are economical to produce and do not require special glass lined containers or the like.

Another object of the present invention is to provide new complexes of zinc-aluminum and/or zirconium-aluminum which have effective antiperspirant properties and can be used in the presence of metal parts without fear of corrosion or contaimination while remaining substantially non-corrosive to skin and fabric clothing.

A further object of the present invention is to provide new complexes of zinc-aluminum and/or zirconium-aluminum which can be dissolved in effective concentrations in non-aqueous volatile solvents while maintaining effective ionicity.

Still another object of the present invention is to provide a composition which can be dispensed in a non-aqueous carrier as a rapidly drying spray which dries on the skin to regulate and control the exudation of perspiration from the skin contiguous thereto.

A still further object of the present invention is to provide alcohol soluble complexes of zinc-aluminum and/or zirconium-aluminum which are useful to form a liquid antiperspirant formulation in which the ionicity of the complex is maintained.

Another object of the present invention is to provide an antiperspirant formulation which avoids the corrosive effect heretofore characteristic of the prior art mineral acid salts and yet obtain an antiperspirant action of comparable effect.

It is another object of the present invention to provide antiperspirant compositions which can be readily administered from and by aerosol dispensers which are highly effective in inhibiting or retarding the exudation of perspiration from the human body.

Still another object of the present invention is to provide new and useful coordination compounds of zinc-aluminum and/or zirconium-aluminum which are characterized by ionicity of the coordination compounds and which obtain, in non-aqueous solvents, a solubility of at least about 10%, and to provide methods of preparing such compounds.

These and still further objects as shall hereinafter appear, are fulfilled by the present invention to a remarkably unexpected extent as can be discerned from the following detailed description and exemplary embodiments thereof, it being understood that the description and examples are presented to accomplish an understanding of our contribution but not to limit its inherent application or natural scope.

Thus, we have found that the disadvantages associated with the many prior art compositions may be overcome and that all of the aforestated objects and research goals attained by the preparation and utilization of the special coordination compounds (complexes) containing aluminum and having the formula

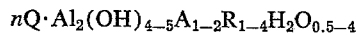

wherein Q is selected from the group consisting of zinc chloride, zinc iodide, zinc bromide, zinc hydroxy chloride, zinc hydroxy iodide, zinc hydroxy bromide, zirconyl chloride, and zirconyl hydroxy chloride; A is selected from the class consisting of chloride, bromide, and iodide; R is the coordinating moiety of a polyhydroxy compound having a carbon chain in which at least two carbon atoms link a hydroxyl group, or substituted hydroxyl group, to said chain, and $n$ is the number of moles of Q and is at least 0.05.

In preparing the zinc-aluminum and/or zirconium-aluminum complexes shown above, particularly advantageous results are obtained by combining an aluminum salt selected from the group consisting of aluminum basic chloride, aluminum basic bromide and aluminum basic iodide with a compound selected from the group consisting of zinc chloride, zinc iodide, zinc bromide, zinc hydroxy chloride, zinc hydroxy iodide, zinc hydroxy bromide, zirconyl chloride, and zirconyl hydroxy chloride; and then mixing the above combination with a polyhydroxy compound, that is, an organic compound containing two or more hydroxy or substituted hydroxy groups which are linked to adjacent or non-adjacent carbon atoms, for further reaction. The aluminum and zinc or zirconium salts and the polyhydroxy compound, thus combined, form a solution which with heat forms the complex of the present invention. Preferably, though not necessarily, the heating will continue until substantially all excess water is expelled from the solution and a dry product is formed. Under certain conditions, as shall appear, the solution is highly useful and drying can be omitted.

As used herein, the term "aluminum basic chloride," refers to those compounds having the empirical formula: $Al_2(OH)_xCl_y$; wherein $x$ is a positive integer of from 2 to 5; $y$ is a positive integer of from 1 to 4; and $x$ and $y$ will always total 6. Representative of the aluminum basic chlorides herein contemplated are:

Similar considerations apply with respect to aluminum basic iodide and aluminum basic bromide.

The term "polyhydroxy compound" as used herein, means those organic compounds containing (prior to condensation) two or more hydroxy or substituted hydroxy groups linked to adjacent or non-adjacent carbon atoms. We specifically intended to include, although not be limited to, dihydric and polyhydric alcohols and glycol ethers.

Suitable aluminum salts for the practice of the invention include aluminum basic chloride, aluminum basic iodide and aluminum basic bromide. Particularly fine results are obtained when an aluminum basic chloride having an aluminum to chlorine mol ratio of from about 1:3 up to about 2.1 to 1, more advantageously between about 1:1 to about 2:1, is used in the practice of the invention.

Suitable polyhydroxy compounds for use in the practice of the present invention include: propylene glycol; 1,1,1-trimethylopropane; 1,3-butylene glycol (1,3-butanediol); glycerine (1,2,3-trihydoxy propane); 2-methyl-2,4-pentane-diol; neopentyl glycol (2,2 - dimethyl - 1,3-dihydroxy pentane); polyethylene glycol (mol wt.=400); butyne-1,3-diol; 2-ethyl-1, 3-hexane-diol; polypropylene glycol (av. mol wt.=400); Polygycol 15–200 (a Dow material having an etheral linkage between propylene oxide and ethylene and condensed with glycerine in which each chain has a terminal hydroxy group (mol wt.= 2700)); diacetone alcohol; p-xylene α,α diol; glycol dimercaptoacetate; and polyepichlorohydrin.

In one practice of the invention, we are able to modify aluminum chlorhydroxide, characterized previously, to create a virtually water-free zinc-aluminum complex which obtains a solubility of 10% and greater in non-aqueous media.

Specifically, we prepared an aqueous solution of aluminum chlorhydroxide ranging from 43–50 percent solids and to this solution we added zinc chloride (96% solids) and heated the combination to about 95° C. with agitation. To the heated solution, we added from about 27 to about 77% of propylene glycol (based on the solids content of the solution) while maintaining the temperature at about 95° C. If speed is desired, the solution can be stirred slightly.

Next, this solution may be placed at a temperature ranging from 70° C. (under vacuum) to 120° C. (in air) and this temperature is maintained until the weight loss is equivalent to or greater than all of the free (non coordinated) moisture calculated to be present. This provides a "dry" product, that is, a product having from about 0.5 to about 20.0% retained moisture which has a solubility in SDA 40 of greater than 10%. As will appear, a friable product containing about 20% moisture can be produced, and, on the basis of 10% solids, will provide an aerosol formulation containing only about 2% water. In our preferred practice, the moisture content will be controlled at about 15% maximum because this will create enhanced compatibility with halo-hydro carbon propellants.

Produced in the manner indicated, the complex (that is, the "dry" product) exhibits antiperspirant properties which compare favorably by subjective evaluation to aluminum chlorhydroxide. This effect is believed to result from our retention of the ionicity of the zinc-aluminum in our complex.

In another practice of the invention, we prepared an aqueous solution of aluminum chlorhydroxide as before and to the solution added zirconyl chloride (zirconium oxychloride) (about 50% solids) and heated the combination to 95° C. with agitation. To the heated solution, we then added from about 50 to about 70% of 1,3-butanediol (based on the solids content of the solution) while maintaining the temperature at about 95° C. The solution was stirred slightly.

Next, this solution was placed under a vacuum of about 25 inches of Hg and a temperature of about 70–95° C. was established and maintained until the weight loss is substantially equivalent to (or greater than) all of the free moisture calculated as present. This provides a "dry" product having about 0.5 to about 20% retained moisture. This product also is soluble at greater than 10% in SDA 40.

While the exact mechanism of our reaction is not fully understood, it is believed to involve the displacement of free and bound water and, possibly, a displacement or condensation with hydroxy groups attached to the aluminum metal structure. The hydroxy groups of the polyhydroxy compound appear to be unreactive with the chloride ion. As will appear, the substitution of glycerine and similar polyhydroxy compounds for the propylene glycol and 1,3-butanediol described above, also provides coordination compounds of similar solubility in non-aqueous media. This, as will be shown, is true for many polyhydroxy compounds.

In the foregoing, the starting metal salts may be of any percent solution although the water content should be reasonable since the presence of excessive water merely increases the cost of drying and too little water obstructs efficient mixing. Preferably there will be enough water to enable at least one of the reagents to be characterized a "liquid" although a viscous liquid is quite satisfactory. A "viscous liquid" we define as one possessing a viscosity at 25° C. of from 100-300 centipoises.

The zinc or zirconyl starting materials are preferably granular although aqueous solutions can be employed when convenient.

The polyhydroxy compound can contain some water although if desired anhydrous compound (i.e., 100%) works well.

The stirring of the reagents and the various steps of combination and during drying comprises an effective expedient for mixing and evaporation although when time is of no particular consideration, the stirring can be omitted without any clearly discernible impairment of product quality. Similarly, there is no objection to the use of other conventional mixing procedures in lieu of stirring if the exigencies of a particular installation render it either feasible or desirable. Similarly other known techniques for encouraging a more or less rapid rate of evaporation may be used if desired; the inducement of such an increased rate being, of course, a matter of convenience and time-saving and not a factor in the quality of the complex produced therefrom.

The application of external heat to the mixture during drying is calculated to enhance the rate of evaporation and is highly desirable although not essential. Any temperature falling between room temperature and the average boiling temperature of the mixture, i.e., about 110° C., can be used although the rate of evaporation will bear a direct relationship to the temperature selected. Our sense of time efficiency is particularly satisfied by a temperature in the range of about 95° to about 100° C.

The evaporation over heat is calculated to significantly reduce the time necessary to accomplish the final drying. A volume reduction to about 0.8 time the original volume provides a convenient and readily discernible measure for it is at about this amount of volume reduction that the reacting solution acquires visible viscosity.

A preferred procedure will involve the use of drying trays which may be formed of glass or of any other material which is capable of remaining inert with respect to our ingredients. Teflon linings may prove advantageous while iron in particular, should be avoided because it does react with the reagents to cause a disagreeable product discoloration. The shallow trays themselves are extremely helpful because they expose a greater area of material and thereby expedite the evaporation process.

It has been found that the evaporation phase may be accomplished at temperatures as high as 120° C. without scorching the product while temperatures on the order of about 50° C. may also be used under a vacuum although the time required to complete the evaporation of the water from the product is extended.

It should be noted that in addition to evaporating the water, which comprised the solvent for the original reagent solutions, we are also evaporating from more than one-half to substantially all of the coordinate water from the aluminum-metal salt.

The exact chemical structure of the new complexes of this invention are not fully understood although it is believed that they involve coordination chemistry from which point of view they will be described. Present-day instruments do not permit an exact structural analysis of coordination compounds and it is therefore necessary to hypothecate as to their structure.

As indicated above, the complex produced in accordance with this invention is believed to have the following formula:

$$nQ\cdot Al_2(OH)_{4-5}A_{1-2}R_{1-4}H_2O_{0.5.4}$$

wherein the symbols are as previously defined.

In the preferred practice of the invention employing zirconium compounds, the resulting complex will have the formula $$nZrOCl_2\cdot Al_2(OH)_{4-5}A_{1-2}R_{1-4}H_2O_{0.7-4}$$

wherein $n$ is the number of moles of zirconyl chloride and always at least 0.05, A is an anion selected from the group consisting of chloride, iodide and bromide, and R is the coordinating moiety of the polyhydroxy compound as previously described.

Our preferred practice with zinc compounds provides a complex having the formula $$nZnCl_2\cdot Al_2(OH)_{4-5}A_{1-2}R_{1-2.5}H_2O_{0.5-4}$$

wherein $n$ is the number of moles of zinc chloride and always at least 0.05 and A and R are as defined above.

To further aid in the understanding of the present invention, and not by way of limitation, the following examples are presented:

EXAMPLE I

We added 45.0 g. of 50% zirconium oxychloride (0.01 mol Zr) to 76.1 g. of hot 50% aluminum chlorhydroxide (0.35 mol Al). The gel that formed was essentially dissolved with prolonged heat and agitation and reflux at 100° C. continued for 0.5 hour. To the cloudy solution added 29.6 g. of propylene glycol and continued refluxing for two hours. The solution was filtered clear and tray dried at about 95° C. and 26 inches Hg vacuum to yield a solid which was very slowly soluble in anhydrous ethanol.

Yield—66.1 g. Assay—14.7% Al, 8.6% Zr, 15.8% Cl, 7.5% $H_2O$.

EXAMPLE II

With agitation, we added 6.9 g. of zinc chloride to 109.6 g. of 50% aluminum chlorohydroxy. After solution was complete, we added 38.0 g. of propylene glycol and heated the mixture at 95–100° C. for one hour. Next, we evaporated the clear solution to near constant weight at 70° C. and about 10 mm. Hg pressure. The solids thus obtained were readily soluble to at least 30% by weight in anhydrous ethanol.

Yield—79.2 g. Assay—17.0% Al, 4.05% Zn, 15.6% Cl, 6.8% $H_2O$.

EXAMPLE III

We mixed 109.6 g. of 50% aluminum chlorhydroxide and 8.88 g. of 96% zinc chloride and heated at 95° C. for one hour. Then we added 24.5 g. of propylene glycol to the mix and the clear solution was heated an additional hour at about 95° C. The product was dried to near constant weight at 80° C. and about 10 mm. Hg pressure. The solids obtained were readily soluble in anhydrous ethanol.

Yield—66.3 g.

EXAMPLE IV

We dissolved 17.75 g. of 96% zinc chloride in 109.6 g. of 50% aluminum chlorhydroxide and heated one hour at 95° C. To this we added 19.8 g. of propylene glycol and continued heating one hour at 95° C. The solution was then dried to near constant weight in a rotary vacuum drier at about 70° C. and 10 mm. Hg pressure. The product obtained was rapidly soluble to at least 30% in anhydrous ethanol.

Yield—83.0 g. Assay—15.8% Al, 10.2% Zn, 21.25% Cl, 8.5% $H_2O$.

EXAMPLE V

We heated 109.6 g. of 50% aluminum chlorhydroxide and 8.88 g. of 96% zinc chloride at 95° C. for one hour. We then added 47.5 g. of propylene glycol and continued heating for one hour. The resulting composition was dried at 70° C. and 10 mm. Hg pressure to a constant weight to yield a very sticky semi-solid. The product was dissolved in about 200 ml. of anhydrous methanol and redried under the same conditions to yield a very friable solid, which was extremely soluble in anhydrous ethanol.

Yield—90.7 g. Assay—14.9% Al, 4.6% Zn, 14.5% Cl, 4.2% $H_2O$.

EXAMPLE VI

We dissolved 17.75 g. of 96% zinc chloride, in 109.6 g. of 50% aluminum chlorhydroxide and heated at 95° C. for one hour. To this we added 34.6 g. of 1,3-butanediol and continued heating one hour. This composition was then evaporated to constant weight at about 70° and 10 mm. Hg pressure. The product obtained was rapidly soluble to at least 30% by weight in anhydrous ethanol.

Yield—92.5 g. Assay—14.3% Al, 8.8% Zn, 16.7% Cl, 3.6% $H_2O$.

EXAMPLE VII

We dissolved 17.75 g. of 96% zinc chloride, in 109.6 g. of 50% aluminum chlorhydroxide and heated at 95° C. for one hour. We then dissolved 51.5 g. of trimethylol propane in the hot solution and continued heating one hour. This solution was then evaporated to constant weight at 70° C. and about 10 mm. Hg. pressure. The product obtained was rapidly soluble to at least 30% by weight in anhydrous ethanol.

Yield—113.2 g. Assay—12.0% Al, 7.8% Zn, 15.8% Cl, 5.8% $H_2O$.

EXAMPLE VIII

We added 51.4 g. of a 50% aqueous zirconium oxychloride solution (0.08 mol Zr) to 69.6 g. of a hot agitated 50% solution of aluminum chlorhydroxide (0.32 mol Al). A turbid gel, which formed immediately, was slowly dissipated with heat and agitation and the cloudy solution was refluxed at 95–100° C. for 0.5 hour. Next, we added 34.8 g. of propylene glycol and continued reflux for 2.0 hours. The solution filtered clear and tray dried at about 95° C. and 26 inches vacuum. The product obtained was slowly soluble to at least 30% by weight in anhydrous ethanol.

Yield—69.0 g. Assay—14.2% Al, 11.1% Zr, 15.4% Cl, 7.4% $H_2O$.

EXAMPLE IX

To 56.6 g. of preheated 50% aluminum chlorydroxide (0.26 mol Al), we added 83.8 g. of 50% zirconium oxychloride (0.13 mol Zr). The gel that formed was dissipated with heating and agitation and the mixture refluxed for 0.5 hour at about 100° C. We then added 28.3 g. of propylene glycol and continued refluxing for 2.0 hours. The resulting solution was filtered clear and tray dried at about 95° C. and 26 inches vacuum. The solid product thus obtained was soluble to at least 30% by weight in anhydrous ethanol.

Yield—63.8 g. Assay—14.9% Al, 12.1% Zr, 17.4% Cl, 13.6 $H_2O$.

EXAMPLE X

To 87.0 g. of preheated 50% aluminum chlorhydroxide (0.4 mol Al) we added 12.8 g. of 50% zirconium oxychloride (0.02 mol Zr). The gelatinous mass that formed was partially solubilized by heat and agitation and the mixture refluxed at at 100° C. for an additional 0.5 hour. We then added 43.5 g. of propylene glycol and continued refluxing for two hours. The solution was then filtered clear and tray dried at about 95° C. and 26 inches vacuum. The product was readily soluble to at least 30% by weight in anhydrous ethanol.

Yield—63.2 g. Assay—17.6% Al, 3.0% Zr, 12.0% Cl, 5.7% $H_2O$.

EXAMPLE XI

We dissolved 71.8 g. of about 95% zinc chloride in 54.8 g. of 50% aluminum chlorhydroxide and heated the solution at 95° C. for one hour. We then added 19.0 of propylene glycol to the solution and continued heating it at 95° C. for one hour. With agitation and heating, we also added 50 g. of an aluminum hydroxide gel (10.9% $Al_2O_3$). After solution was virtually complete, it was filtered clear and evaporated under vacuum at about 70° C. to a very viscous mass. This was dissolved in 250 ml. of anhydrous ethanol and dried to a glassy solid in a rotary drier at 80° C. and about 10 mm. Hg pressure. The solids thus obtained were rapidly soluble to at least 30% by weight in anhydrous ethanol.

Yield—113.3 g. Assay—9.0% Al, 24.9% Zn, 30.1% Cl, 3.0% $H_2O$.

EXAMPLE XII

We added 64.4 g. of 50% zirconium oxychloride (0.10 mol Zr) to a heated 50% aqueous solution of aluminum chlorhydroxide (0.40 mol Al). The resulting gel was dissipated with heat and agitation and refluxed at 100° C. for 0.5 hour. We then added 43.6 g. of propylene glycol to the hot cloudy solution and continued refluxing for two hours. This solution was then filtered clear and transferred to a round bottom distillation apparatus equipped with agitation. With heating, the solution was concentrated a viscous but flowable mass. We then added 1100 mls. of anhydrous ethanol in 100 ml. increments and continued distilling until a total of about 900 mls. of the water-alcohol azeotrope had been removed.

Yield—255 g. of a clear alcoholic solution. Assay—4.2% Al, 3.5% Zr, 4.8% Cl, 3.5% $H_2O$.

EXAMPLE XIII

To 69.6 g. of preheated 50% aluminum chlorhydroxide (0.32 mol Al), we added 51.4 g. of 50% zirconium oxychloride. The gel that formed was dissipated with heating and agitation and then refluxed at 100° C. for 0.5 hour. We then added 33.8 g. of 1,3-butanediol and continued refluxing for two hours. This solution was filtered clear and dried to near constant weight at about 70° C. and 10–15 mm. Hg. pressure. The solids thus obtained were readily soluble to at least 30% by weight in anhydrous ethanol.

Yield—70.6 g. Assay—11.8% Al, 9.6% Zr, 14.3% Cl, 8.6% $H_2O$.

EXAMPLE XIV

To 69.6 g. of hot aluminum chlorhydroxide (0.32 mol Al), we added 51.4 g. of 50% zirconium oxychloride. The gel was virtually dissolved with heat and agitation and then refluxed at 100° C. for 0.5 hour. We then dissolved 33.0 g. of trimethylol propane in the cloudy solution and continued reflexing for two hours. This solution was then filtered clear and dried to constant weight at about 70° C. and 10 mm. Hg pressure. The product obtained was readily soluble to at least 30% in anhydrous ethanol.

Yield—61.0 g. Assay—11.5% Al, 9.55% Zr, 14.1% Cl, 10.0% $H_2O$.

Another important aspect of the present invention is the incorporation of the coordination compounds of this invention in combination with certain of the so-called aerosol propellants such, for example, as trichloromonofluoromethane (Freon 12), dichlorotetrafluoroethane (Freon 114), monochlorodifluoromethane (Freon 22), trichlorotrifluoroethane (Freon 113), octafluorocyclobutane (Freon C 318), pentafluoromonochloroethane (Freon 115), dimethyl ether, vinyl chloride, nitrous oxide, nitrogen, 1,1-difluoroethane, and 1,1,1-chlorodifluoroethane. Of course, it is anticipated that some of the more exotic, and hence more expensive propellants may be utilized although they contribute nothing which can not be obtained from the more conventional and hence less expensive propellants as listed above.

The alcohol carrier can be any of the approved denatured ethyl alcohols such, for example, as: SDA–23A; SDA–28B; SDA 39B; SDA–39C; SDA–40; SDA 40A and the like as well as isopropyl alcohol, and the di- and polyhydric alcohols. The di- and polyhydric alcohols can be used alone or in addition to a primary solvent since it appears to enhance the miscibility of the solvent with the propellant. As is well known in the art, ethanol is truly representative of the non-aqueous solvents commercially available and solubility in ethanol is reflective of like compatibility in the other non-aqueous solvents.

Using the complexes of the invention, a variety of antiperspirant formulations were prepared for use as lotions, colognes, powders, as well as in aerosol formulations. Thus, while our complexes are especially suited for use in aerosol dispensers, we also find them to be excellent when used for their antiperspirant qualities irrespective of aerosol dispensers.

The further examples set forth below, show suitable formulations of the type indicated in which complexes prepared according to the invention (denoted "ASC" with suffix reference to above examples, that is, "ASC–XII" means the complexes of Example XII) are used to typify all of the complexes embraced herein.

EXAMPLE XV

Lotion

| | Parts |
|---|---|
| Cerosynt 1000–D | 3.0 |
| Emulsynt 2400 | 7.0 |
| Lanolin (anhydrous) | 1.0 |
| Water | 62.0 |
| ASC–I | 27.0 |
| Perfume q.s. | |

EXAMPLE XVI

Cologne

S.D. Alcohol #40: 50 cc.
Sindar G–11: 0.25 g.
Water: 113 cc.
Versene Regular: 0.1 cc.
ASC–III: 27.0 g.
Perfume q.s.

EXAMPLE XVII

Powder

| | G. |
|---|---|
| ASC–IV | 13.0 |
| Calcium Carbonate | 3.0 |
| Sindar G–11 | 0.5 |
| Talcum | 83.5 |

EXAMPLE XVIII.—AEROSOL FORMULATIONS WITH ASC

| | A | B | C | D | E | F | G |
|---|---|---|---|---|---|---|---|
| ASC–I | 10 | 10 | 10 | 15 | 10 | 10 | 15 |
| SDA–40 | 60 | 59 | 35 | 55 | 60 | 50 | 55 |
| Propylene glycol | 5 | 5 | 5 | 5 | | | |
| Glycerin | | | | | 5 | | 5 |
| Tetraethylene glycol | | | | | | 15 | |
| Amerchol L101 | | 1 | | | | | |
| Freon 114/12 (90%/10%) | 25 | 25 | 50 | 25 | 25 | 25 | 25 |

In Examples XV to XVIII, Cerosynt 1000–D is a brand of glycerol monostearate manufactured by Van Dyk & Company; Emulsynt 2400 is a brand of polyoxyethylene glycol laurate/oleate manufactured by Van Dyk & Company; Sindar G–11 is a brand of hexachlorophene manufactured by Sindar Corporation, New York, N.Y.; Versene Regular is a brand of tetrasodium salt of ethylenediamine tetraacetic acid manufactured by the Dow Chemical Company, Midland, Mich.; Amerchol L101 is a lanolin-derived sterol extract manufactured by American Cholesterol Porducts, Inc.; Freon 114 is a dichloro-tetrafluoroethane, manufactured by Du Pont Company, Wilmington, Del.; Freon 12 is a dichlorodifluoromethane, manufactured by Du Pont and Freon 114/12 is any desired mixture of Freon 114 and Freon 12.

From the foregoing it becomes apparent that new and novel complexes (coordination compounds) and methods of preparing them as well as methods and formulations for utilizing them as antiperspirants and especially, though not exclusively, as aerosol dispensed antiperspirants, has been herein described and illustrated which fulfill all of the aforestated objectives and research goals to a remarkably unexpected extent. It is, of course, understood that this description and accompanying examples are presented for illustrative purposes only and not by way of limitation and that such modifications, alterations and applications as may readily occur to the artisan confronted with this disclosure are included within the spirit of this invention, especially as it is defined by the scope of the claims appended hereto.

What is claimed is:

1. An antiperspirant composition in the form of an aerosol consisting essentially of an aerosol propellant, an alcohol carrier and between about 10 to 15 weight percent of an organic-inorganic complex having the formula:

$$nQ \cdot Al_2(OH)_{4-5}A_{1-2}R_{1-4}H_2O_{4.5-4}$$

wherein Q is a member of the group consisting of zinc chloride, zinc iodide, zinc bromide, zinc hydroxy chloride, zinc hydroxy iodide, zinc hydroxy bromide, zirconyl chloride, and zirconyl hydroxy chloride; A is an anion selected from the group consisting of chloride, bromide and iodide; R is the coordinating moiety of a polyhydroxy compound having at least two carbon atoms to which are attached at least two hydroxy groups, and $n$ is the number of moles of Q and is at least 0.05.

2. An antiperspirant composition in accordance with claim 1 which contains a conventional cosmetic adjuvant.

References Cited

UNITED STATES PATENTS

| | | | |
|---|---|---|---|
| 2,906,668 | 9/1959 | Beekman | 424—66 |
| 3,009,769 | 11/1961 | Grote | 424—66 |
| 3,405,153 | 10/1968 | Jones | 424—66 |

ALBERT T. MEYERS, Primary Examiner

A. P. FAGELSON, Assistant Examiner

U.S. Cl. X.R.

424—65, 66, 67, 68